United States Patent [19]

Wenzel et al.

[11] 4,149,984

[45] Apr. 17, 1979

[54] LUBRICATING OIL ADDITIVES

[75] Inventors: Franz Wenzel, Darmstadt; Ulrich Schoedel, Rossdorf; Heinz Jost, Messel; Hans Pilz, Darmstadt, all of Fed. Rep. of Germany

[73] Assignee: Rohm GmbH, Darmstadt, Fed. Rep. of Germany

[21] Appl. No.: 860,825

[22] Filed: Dec. 15, 1977

[30] Foreign Application Priority Data

Sep. 8, 1977 [DE] Fed. Rep. of Germany ....... 2740449

[51] Int. Cl.² ............................................. C10M 1/32
[52] U.S. Cl. ............................ 252/51.5 A; 252/56 R; 260/33.6 UA; 260/878 R; 526/260; 526/265
[58] Field of Search ................. 252/51.5 A, 56 R, 59; 260/33.6 UA, 878 R; 526/260, 265

[56] References Cited

U.S. PATENT DOCUMENTS

| 2,091,627 | 8/1937 | Bruson | 252/56 R |
|---|---|---|---|
| 2,655,479 | 10/1953 | Munday et al. | 252/56 R |
| 3,210,282 | 10/1965 | Bearden | 252/51.5 A |
| 3,567,639 | 3/1971 | Aaron et al. | 252/56 R |
| 3,879,304 | 4/1975 | Waldbillig | 252/51.5 A |
| 3,897,353 | 7/1975 | Morduchowitz et al. | 252/51.5 A |
| 4,036,766 | 7/1977 | Yamamoto et al. | 252/51.5 A |

FOREIGN PATENT DOCUMENTS 1235491   3/1967   Fed. Rep. of Germany ........ 252/56 R

*Primary Examiner*—Delbert E. Gantz
*Assistant Examiner*—Andrew Metz
*Attorney, Agent, or Firm*—Curtis, Morris & Safford

[57] ABSTRACT

A method is disclosed for making a polymer-in-oil solution, useful for improving the viscosity-temperature relationship and low-temperature properties of lubricating oils when added thereto, which method comprises a first step of polymerizing a methacrylic acid ester of an alcohol having 8 to 18 carbon atoms in a solution, in a lubricating oil, of a polyolefin polymer of an olefinic hydrocarbon monomer having 2 to 4 carbon atoms, the oil solution of said polyolefin having a viscosity of less than 15,000 centistokes at 100° C., and then, in a second step, adding further polyolefin polymer of the type defined herein until the total polymer content in the oil solution is from 20 percent to 55 percent by weight of said solution and said methacrylate ester comprises from 50 percent to 80 percent of said polymer content.

10 Claims, No Drawings

LUBRICATING OIL ADDITIVES

The present invention relates to a method for making additives which improve the viscosity-temperature relationship and the pour point of lubricating oils, and, in a particularly advantageous embodiment, also improve their dispersing behavior.

Polymethacrylates have been known for a long time as lubricating oil additives and are used on a large technical scale. In the last years the more economical polyolefins have found increasing significance for the same purposes. Both classes of products show advantages and disadvantages: polymethacrylates are characterized by a good effect from the point of view of the viscosity-temperature relationship of the oil improved therewith, and, when used in sufficiently high concentration, show an outstanding protective effect against wear. Further, they lower the pour point of lubricating oil. On the other hand, the treating costs for these products are comparatively high. This concept is to be understood as meaning the costs required for achieving a desired effect. Polyolefins bring about the same thickening of oil as do polymethacrylates, even already in clearly smaller concentrations, but polyolefins do not improve the pour point. In order to achieve an improvement in the pour point, lubricating oil additives comprising polyolefins must have added thereto special pour point improvers such as chlorination products of wax and naphthalene, polyalkylmethacrylates, copolymers of alkylaminoalkylmethacrylates and alkymethacrylates, and polyalkylacrylates, in small amounts, for example in amounts less than 0.5 percent by weight. Nevertheless, the decrease in the pour point by the addition of pour point improvers encounters difficulties with certain polyolefins, particularly those which tend to form associates.

Olefin copolymers having a high ethylene content (greater than 50 percent by weight) show a clear tendency toward association. Correspondingly, when they are used problems arise in the low-temperature region. Since, however, they are on the other hand characterized by a particularly high thickening effect and thus increase treating costs by relatively little, it remained to be investigated whether the unfavorable low-temperature properties of this class of olefin copolymers could be compensated. Since, as mentioned above, polyolefins are employed in a smaller concentration than are polymethacrylates, the protection against wear which is achieved by their use is unsatisfactory.

The preparation of a combination product taking the aforementioned points into account was obvious. Products of this kind have already been described. No difficulties are encountered as long as only a small amount (by which should be understood less than about 5 percent, calculated on the total polymer content) of each of the VI-improvers which are under discussion is combined simply with the predominant portion of whatever other VI-improver is employed, that is, in such a manner that solutions of two products are mixed together in oil.

Because of the already-mentioned high thickening effect of polyolefins, in practice commercial products are as a rule prepared which, on the one hand, have a high absolute polymer content which, on the other hand, consists predominantly of polymethacrylates. If the polymethacrylate portion is raised above the level of 5 percent mentioned as a limit on content, the incompatibility of both polymers with each other leads to a separation of the polymers in oil which, on sufficiently long storage, can lead to layer formation. For avoiding this phenomena, which shows such a product to be useless, it has already been proposed to make the polyolefin and polymethacrylate compatible by polymerizing methacrylic acid esters (as known in the art, those with an alcohol moiety, suitably suitably an alkanol moiety, having 8 to 18 carbon atoms are involved) in a known fashion in a solution of the polyolefin in oil. It is known that the methacrylate in part graft polymerizes onto the olefin (cf. German Auslegeschrift No. 1,235,491). For the sake of thoroughness it should be mentioned at this point that both homopolymers of ethylene, propylene, n-butylene and i-butylene, as well as copolymers of these olefins, are known as VI-improvers.

The problem to be solved by the present invention can now be more exactly defined: in view of the urgent requirement to impart a high wear resistance to improved lubricating oils with the products of the present invention, particularly in rapidly running motors, the new products should have a polymer component which comprises from 50 to 80 percent by weight of methacrylate component units and from 50 to 20 percent by weight of an olefinic homopolymer or copolymer, suitably of an olefin having 2 to 4 carbon atoms such as ethylene, propylene, n-butylene, and isobutylene. The solids content of the product of the process should be as high as possible, but nevertheless the oft-mentioned high thickening effect of the polyolefins set limits to this requirement. The solids content in the products of the invention should be between 20 and 55 percent by weight.

The most obvious method of making lubricating oil additives from the aforementioned polymer combination in the aforementioned amounts of the individual components by mixing both products in the form of an oil solution is unsuccessful in view of the incompatibility, already mentioned. The further attempt to prepare an homogeneous end product by the polymerization of the methacrylic acid ester (or the mixtures of long-chain methacrylic acid esters which are as a rule employed) in a solution of the polyolefin in oil failed. Products prepared in this manner also exhibit the aforementioned separation, whereas when the process according to the invention described below is carried out, homogeneous products of unlimited storage stability are obtained.

Referring now to the present invention in particular: The use of polyolefins having an average molecular weight between 70,000 and 200,000 is particularly advantageous for the formation of the desired products. Products of this kind can be prepared either directly by polymerization or by a controlled thermal and/or mechanical degradation of higher molecular weight products. It should not go unmentioned that it is fundamentally possible also to carry out the aforementioned degradation of higher molecular weight products after a grafting process which is also part of the present invention and which is described below.

Polyolefins of the kind described are first dissolved in such an amount of the oil phase that the viscosity (measured according to DIN 51562 at 210° F.) of the solution so obtained does not exceed 15,000 centistokes at 100° C. The methacrylic portion is then polymerized in this solution in the manner known for the preparation of lubricating oil additives comprising methacrylates. It deserves mention that, contrary to expectations, the solution so obtained shows a lower viscosity—despite the higher polymer content—than the polyolefin starting solution. This discovery is attributable to the high degree of grafting which occurs on polymerization of the methacrylate monomers in the polyolefin-containing solution.

The exothermic course of the polymerization as a rule necessitates cooling of the batch for maintenance of a temperature between 80° C. and 100° C. After the reaction is concluded, further polyolefin can be dissolved in the polymer solution obtained, advantageously in a temperature region from 120° C. to 170° C., in such an amount that the required relationship between polymethacrylate and polyolefin is achieved. In the first and second solution steps, the polyolefins originally present or additionally added can be either the same or different polyolefins. For example, an olefin copolymer having a high ethylene content, for example a copolymer of about 70 percent by weight of ethylene and 30 percent by weight of propylene, can be employed in the starting solution: in the second step, a copolymer with a considerably higher propylene content can then be employed.

In the synthesis of the lubricating oil additives to be prepared according to the invention, other monomers, in addition to the long-chain methacrylate esters and the heterocyclic compounds to be mentioned later, can also be employed in small amounts, said monomers being known from the preparation of VI-improvers comprising methacrylates, for example acrylate esters, particularly butylacrylate, but also lower methacrylic acid esters (having 1-4 carbon atoms in the alcohol portion), styrene, alpha-methylstyrene, etc.

Among the aforementioned lubricating oil additives, those which show a dispersing effect and detergent effect in addition to the already mentioned effects involving improvement of the viscosity-temperature relationship, the pour point and wear protection, play a significant role. Products of this kind are obtained, for example, by the copolymerization of acrylic esters or methacrylic esters of alcohols having at least 8 carbon atoms with ethylenically unsaturated compounds having a basic tertiary amino group therein, in which the tertiary amino nitrogen is a member of a heterocyclic ring and the polymerizable double bond is found outside the ring but nevertheless is directly next to the ring, according to German Pat. No. 947,186. The aforementioned patent refers to certain difficulties arising from the solubility properties of certain polymers comprising esters. The multifunctional effect, namely, the cleaning and wear-hindering effect of a copolymer of acrylic acid esters and of alkacrylic acid esters of alcohols having at least 8 carbon atoms with polymerizable basic heterocyclic compounds (with the exception of those mentioned above) is part of the teachings of German Pat. No. 1,003,896.

A copolymer of an alkyl acrylate or of an alkyl methacrylate preferably having 4 to 18, especially 16 and more, carbon atoms in the alkyl portion with N-vinyl-2-pyrrolidone is shown by German Auslegeschrift No. 1,058,739 to have the properties of a dispersing agent and cleaning agent, to improve the viscosity index, and to reduce the pour point.

Attempts to impart a dispersing effect to lubricating oil additives comprising polyolefins are also known. German Auslegeschrift No. 1,235,491 proposes graft copolymers of polyolefins with polymerizable nitrogen-containing compounds, particularly heterocyclic compounds, which copolymers possess a dispersing effect in addition to improving the VI.

The process according to the present invention permits the preparation of products with outstanding dispersing and detergent effect, in that the already-mentioned polymerizable heterocyclic compounds can be incorporated into the polymers in question. This can take place by a common polymerization, with the methacrylate, of these compounds, particularly vinyl pyridine, vinyl pyrrolidine, vinyl pyrrolidone, and/or vinyl imidazol. Nevertheless, it is particularly advantageous to graft polymerize the aforementioned heterocyclic monomers in a second polymerization step after extensive polymerization of the methacrylate or after conclusion of the methacrylate polymerization. The amount of heterocyclic compounds which brings about a dispersing effect can be from 1 to 30 percent by weight, based on the methacrylic ester portion and replacing it to that extent.

As a further advantage of the lubricating oil products prepared according to the invention, there is the possibility of excluding a portion of the additives common to lubricating oil formulations, for example, anti-oxidants, ash-free and ash-forming dispersing agents and detergent agents, as well as pour point improvers. In demonstration of the further advantage of achieving outstanding effects using surprisingly small amounts of the product prepared according to the present invention as lubricating oil additives, it can be mentioned that commercial products comprising polymethacrylates have a polymer content of about 50 percent by weight. Qualitatively highly-grade oils are obtained if they contain between 6 and 12 percent of this commercial product, i.e. about between 3 and 6 percent of polymer. In contrast, using the products prepared according to the invention, a considerably smaller polymer fraction can be present in the finished oil, i.e., in an amount between 2 and 4 percent by weight.

To be sure, the polymer content is higher than for finished oils having polyolefins as the polymer component, since the latter is between about 1 and 2 percent by weight. Nevertheless, as already mentioned, the products according to the present invention are superior to these materials in the breadth of their effect. Thus, the correctness of initial assertion is proved that the products according to the present invention permit a reduction in the treating costs.

A commercial product comprising polyolefins, which product corresponds to certain other products also found in the market, contains 12 percent of polyolefin and is used in an amount of 15 percent: that is, the finished oil contains 1.8 percent of polyolefin.

For example, a product prepared according to the present invention which contains 45 percent of polymer component, which in turn comprises 30 percent of polyolefin and 70 percent of polymethacrylate, is used in an amount of 5.5 percent. The finished oil therefore contains 2.475 percent of polymer, whereof the polyolefin fraction is 0.743 percent and the polymethacrylate fraction is 1.733 percent. Such an oil meets the specifications for high-grade lubricating oils as concerns the effect of the polymer.

A better understanding of the present invention and of its many advantages will be had by referring to the following specific examples, given by way of illustration.

EXAMPLE 1

(a) A mixture comprising 90 percent of long-chain methacrylic acid esters ($C_{10}C_{18}$-alcohols) and 10 percent of methyl methacrylate is polymerized in a known manner using a free-radical polymerization catalyst at a temperature of 90° C. in a 10 percent by weight solution, in 150-neutral oil mineral oil, of a degraded polyolefin copolymer having an average molecular weight of 90,000, which copolymer contains 72 percent of ethylene and 28 percent of propylene. The polyolefin-oil solution has a viscosity of 820 centistokes at 210° F. The ester mixture is polymerized in such an amount that the total polymer content at the conclusion of the polymerization is 40 percent. The viscosity of this product at 210° F. is 530 centistokes.

(b) At 120° C., a degraded polyolefin copolymer having an average molecular weight of 90,000 and comprising 54 percent of ethylene and 46 percent of propylene is dissolved in the product of (a) at a temperature of 120° C. in an amount such that the total polymer content reaches 45 percent.

If, in step (a), a degraded polyolefin copolymer is used which also contains 72 percent of ethylene and 28 percent of propylene, but which has an average molecular weight of 120,000 and a 10 percent solution of which in mineral oil has a viscosity of 3,200 centistokes, a product is obtained at the end of the polymerization whose viscosity at 210° F. is 1,200 centistokes.

This is further treated as in (b) above at a temperature of 150° C.

EXAMPLE 2

(a) A mixture comprising 85 percent of long-chain methacrylic acid esters ($C_{10}C_{18}$-alcohols), and 10 percent of butyl methacrylate, and 5 percent of butyl acrylate is polymerized in a known manner using a free-radical polymerization catalyst at a temperature of 90° C. in a 10 percent solution, in 150-neutral oil mineral oil, of a degraded polyolefin copolymer having an average molecular weight of 90,000, which copolymer contains 72 percent of ethylene and 28 percent of propylene and which has a viscosity, in this solution, of 820 centistokes at 210° F. The mixture is polymerized in such an amount such that the total polymer content is 40 percent at the end of polymerization. The viscosity of this product is 420 centistokes at 210° F.

(b) 5 percent of vinyl pyrrolidone, calculated on the polymer content, was polymerized in the polymer product prepared in this fashion, said polymerization occurring at a temperature of 130° C. in the presence of a free-radical polymerization catalyst. Essentially, the polymerization can be carried out according to German Pat. No. 1,520,696.

At a temperature of 140° C., a degraded polyolefin copolymer having an average molecular weight of 90,000 and which contains 54 percent of ethylene and 46 percent of propylene is dissolved in the product so prepared such that a total polymer content of 47 percent is reached.

A mixture of 2 percent of vinyl pyrrolidone with 2 percent of vinyl imidazole can also be employed instead of 5 percent of vinyl pyrrolidone.

What is claimed is:

1. A method for making a polymer-in-oil solution, useful for improving the viscosity-temperature relationship and low-temperature properties of lubricating oils when added thereto, which method comprises a first step of polymerizing a methacrylic acid ester of an alcohol having 8 to 18 carbon atoms in a solution, in a lubricating oil, of a polyolefin polymer of an olefinic hydrocarbon monomer having 2 to 4 carbon atoms, the oil solution of said polyolefin having a viscosity of less than 15,000 centistokes at 100° C., and then, in a second step, adding further polyolefin polymer of the type defined herein until the total polymer content in the oil solution is from 20 percent to 55 percent by weight of said solution and said methacrylate ester comprises from 50 percent to 80 percent of said polymer content.

2. A method as in claim 1 wherein said polyolefin polymer has an average molecular weight between 70,000 and 200,000.

3. A method as in claim 2 wherein said polyolefin polymer is prepared by the thermal or mechanical degradation of a polymer having a higher molecular weight.

4. A method as in claim 1 wherein from 1 to 30 percent by weight of said methacrylate ester is replaced by a polymerizable heterocyclic compound having a basic nitrogen atom in the ring thereof selected from the group consisting of vinyl pyridine, vinyl pyrrolidine, vinyl pyrrolidone and vinyl imidazole.

5. A method as in claim 4 wherein said polymerizable heterocyclic compound is vinyl pyrrolidone, or vinyl imidazole.

6. A method as in claim 4 wherein said polymerizable heterocyclic compound is added to and polymerized in said oil solution of polyolefin polymer in a further step, intervening between said first and second steps, after the polymerization of said methacrylate ester in said first step has proceeded extensively or is practically complete.

7. A method as in claim 1 wherein the polyolefin polymer added in said second step is added at a temperature of said oil solution of between 120° C. and 170° C.

8. A method as in claim 1 wherein the polyolefin polymer in said first step is different from the polyolefin polymer of said second step.

9. A method as in claim 1 wherein the polyolefin polymer in at least one of said first or second steps is a polymer comprising at least 50 percent by weight of ethylene, the balance being propylene.

10. A polymer-in-oil solution prepared by the method of claim 1.

* * * * *